US012415374B2

(12) United States Patent
Shinada

(10) Patent No.: US 12,415,374 B2
(45) Date of Patent: Sep. 16, 2025

(54) PRINTING APPARATUS

(71) Applicant: SEIKO EPSON CORPORATION, Tokyo (JP)

(72) Inventor: Ryosuke Shinada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 238 days.

(21) Appl. No.: 18/449,125

(22) Filed: Aug. 14, 2023

(65) Prior Publication Data

US 2024/0059082 A1 Feb. 22, 2024

(30) Foreign Application Priority Data

Aug. 17, 2022 (JP) ................................ 2022-129926

(51) Int. Cl.
*B41J 15/04* (2006.01)
*B41J 11/00* (2006.01)
*B41J 15/16* (2006.01)

(52) U.S. Cl.
CPC ........... *B41J 15/046* (2013.01); *B41J 11/007* (2013.01); *B41J 15/04* (2013.01); *B41J 15/16* (2013.01)

(58) Field of Classification Search
CPC ........ B41J 15/046; B41J 11/007; B41J 15/04; B41J 15/16
See application file for complete search history.

(56) References Cited

U.S. PATENT DOCUMENTS 9,248,665 B2 2/2016 Yamada
2013/0293650 A1* 11/2013 Yamada ............... B41J 11/0022 347/102
2016/0288543 A1* 10/2016 Yoshida ............... B41J 11/0095

FOREIGN PATENT DOCUMENTS

JP 2013-230657 A 11/2013

* cited by examiner

*Primary Examiner* — Justin Seo
(74) *Attorney, Agent, or Firm* — WORKMAN NYDEGGER

(57) ABSTRACT

A printing apparatus includes: a printing unit that performs printing on a print medium; a support unit disposed facing the printing unit, the support unit supporting the print medium; a plurality of first transport rollers that transport the print medium to the support unit; a medium collection unit that winds in a roll shape the print medium on which printing was performed by the printing unit; and a plurality of second transport rollers that transport the print medium from the support unit to the medium collection unit. Each interval between the plurality of first transport rollers is narrower than an average value of each interval between the plurality of second transport rollers.

6 Claims, 4 Drawing Sheets

PRINTING APPARATUS

The present application is based on, and claims priority from JP Application Serial Number 2022-129926, filed Aug. 17, 2022, the disclosure of which is hereby incorporated by reference herein in its entirety.

BACKGROUND

1. Technical Field

The present disclosure relates to a printing apparatus.

2. Related Art

In the related art, a printing apparatus with a steering unit provided upstream of the print head is known as a configuration of a printing apparatus in which a print medium is transported to the print head (e.g., refer to JP-A-2013-230657).

In order to improve a printing speed of the printing apparatus, for example, it is conceivable for the configuration disclosed in JP-A-2013-230657 to increase the size of the platen in the transport direction. With this configuration, the length of transport by which the print medium is intermittently transported toward the platen is increased. For this reason, the transport path from the steering unit to the platen needs to be lengthened, which leads to the problem that the print medium easily meanders. In addition, in order to suppress meandering of the print medium, the number of transport rollers needs to be increased to make the intervals between the transport rollers narrower, which increases the size and cost of the apparatus.

SUMMARY

An aspect of the present disclosure is a printing apparatus including: a printing unit configured to perform printing on a print medium, a support unit disposed facing the printing unit, the support unit supporting the print medium, a plurality of first transport rollers configured to transport the print medium to the support unit, a medium collection unit configured to wind in a roll shape the print medium on which printing was performed by the printing unit, and a plurality of second transport rollers configured to transport the print medium from the support unit to the medium collection unit, in which each interval between the plurality of first transport rollers is narrower than an average value of each interval between the plurality of second transport rollers.

DESCRIPTION OF EMBODIMENTS

1. Overall Configuration of Printing Apparatus

Embodiments of the disclosure will be described below with reference to the accompanying drawings.

Figure 1:
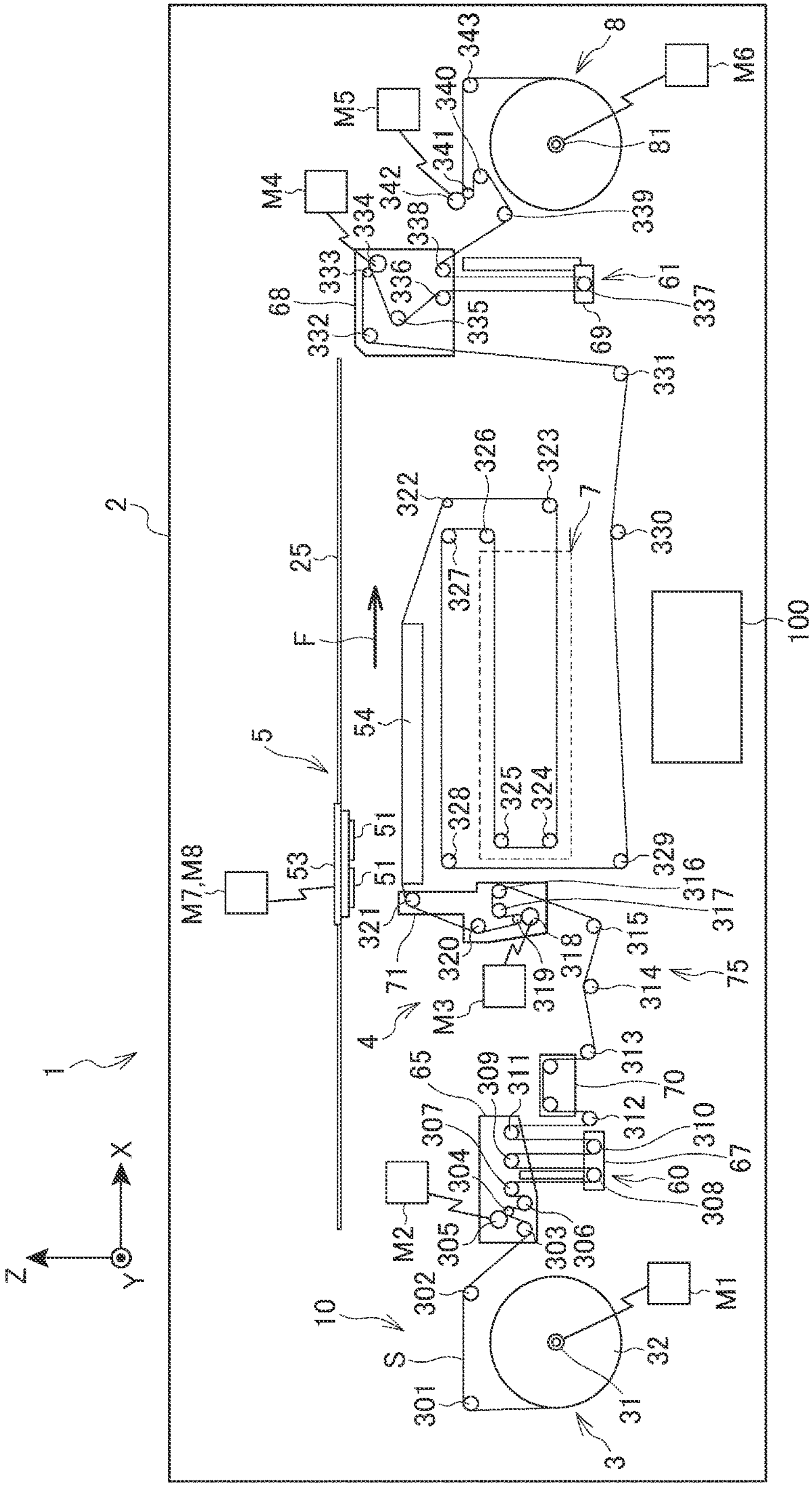
FIG. 1 is a diagram illustrating an overview of a printing apparatus according to the present embodiment.

FIG. 1 is a schematic diagram illustrating an overall configuration of a printing apparatus 1. In FIG. 1 and the drawings described below, XYZ orthogonal coordinates are illustrated in order to describe directions in a state in which the printing apparatus 1 is installed. The Z axis indicates a vertical direction in the state in which the printing apparatus 1 is installed, and can be referred to as a height direction. The X axis indicates a left-right direction of the printing apparatus 1. The Y axis is a direction orthogonal to the X axis, and can be referred to as a front-rear direction.

The printing apparatus 1 performs printing on a print medium S with a printing unit 5. Various types of sheets can be used as the print medium S used in the printing apparatus 1. The following description introduces a configuration in which label paper formed by placing labels with an adhesive backing on release paper and winding the paper in a roll shape is used as the print medium S. Although a printing method of the printing apparatus 1 is not limited, in the embodiment, an inkjet printer that ejects ink to the print medium S with the printing unit 5 is described as an example of the printing apparatus 1.

The printing apparatus 1 has a configuration in which a medium supply unit 3, the printing unit 5, a drying unit 7, a medium collection unit 8, and a control device 100 are disposed in a housing 2. The housing 2 is attached to a frame of the printing apparatus 1, which is not illustrated, and accommodates the above-described units.

The print medium S is transported between the medium supply unit 3 and the medium collection unit 8, and a transport path of the print medium S is indicated by reference sign 10. A plurality of transport rollers 301 to 343 that come into contact with the print medium S are disposed in the transport path 10. The print medium S supplied from the medium supply unit 3 is transported in the transport direction indicated by the arrow F in the drawing in the transport path 10. The transport rollers 301 to 321 are positioned upstream of the printing unit 5 in the transport path 10. On the other hand, the transport rollers 322 to 343 are positioned downstream of the printing unit 5.

The printing apparatus 1 includes motors M1 to M6, and the motors M1 to M6 generate a driving force for transporting the print medium S. The feeding motor M1 drives the supply shaft 31 of the medium supply unit 3, the feeding nip motor M2 drives the transport roller 305, and the supply nip motor M3 drives the transport roller 318. These motors M1, M2, and M3 are for supply-side power for supplying the print medium S from the medium supply unit 3 to the printing unit 5. On the other hand, a discharge nip motor M4 drives the transport roller 334, the winding nip motor M5 drives the winding transport roller 342, and the winding motor M6 drives a winding shaft 81 of the medium collection unit 8. These motors M4, M5, and M6 are for collection-side power for collecting the print medium S on which printing was performed by the printing unit 5 to the medium collection unit 8.

The medium supply unit 3 includes the cylindrical or columnar supply shaft 31. A roll body 32 on which the print medium S is wound in a roll shape can be mounted on the supply shaft 31, and the medium supply unit 3 supports the roll body 32 with the supply shaft 31. The supply shaft 31 is rotated by the power of the motor M1 to feed the print medium S from the roll body 32 toward the printing unit 5.

The printing unit 5 prints characters and images on the label of the print medium S by ejecting ink toward the print medium S. The printing unit 5 includes a platen 54, a plurality of ejection heads 51 that eject ink, and a carriage 53 that holds the ejection heads 51. The platen 54 includes, for example, a rectangular flat surface and is parallel to the XY plane in the installation state of the printing apparatus 1. The platen 54 supports the print medium S from below. A suction hole or the like for holding the print medium S on the platen 54 by applying suction force to the print medium S may be formed in the platen 54. The platen 54 corresponds to an example of a support part.

The carriage 53 is disposed above the platen 54 to face the platen 54. The carriage 53 is capable of reciprocating in the X-axis direction along a first guide rail 25 installed in the printing apparatus 1 in the X-axis direction. The carriage 53 is capable of reciprocating in the Y-axis direction along a second guide rail, which is not illustrated, installed in the Y-axis direction. The printing apparatus 1 includes a first carriage motor M7 that moves the carriage 53 along the first guide rail 25 and a second carriage motor M8 that moves the carriage 53 along the second guide rail. The printing apparatus 1 moves the ejection head 51 in the X-axis direction and the Y-axis direction with power of the motors M7 and M8. With this configuration, the ejection head 51 can move over the print medium S supported by the platen 54 in the X-axis direction and the Y-axis direction to eject ink to the entire print medium S.

When printing is performed on the print medium S, the printing apparatus 1 intermittently transports the print medium S. That is, the printing apparatus 1 transports the print medium S to the platen 54 and stops the transport of the print medium S in a state in which the print medium S is disposed in a predetermined region of the platen 54. Here, the printing unit 5 causes the ejection head 51 to eject ink while moving the ejection head 51 in the X-axis direction and the Y-axis direction to perform printing on the print medium S. After printing, the printing apparatus 1 transports the print medium S until the printed portion of the print medium S moves downstream of the platen 54. Then, the printing apparatus 1 stops the transport of the print medium S and performs printing with the printing unit 5.

A feeding-side buffer unit 60 and a meandering correction unit 70 that corrects meandering of the print medium S are disposed between the medium supply unit 3 and the printing unit 5 in the transport path 10.

The feeding-side buffer unit 60 includes a feeding-side fixed plate 65 that is directly or indirectly fixed to the frame of the printing apparatus 1 and a feeding-side movable plate 67 that can move up and down. The seven transport rollers 303, 304, 305, 306, 307, 309, and 311 are rotatably supported by the feeding-side fixed plate 65. The two transport rollers 308 and 310 are rotatably supported by the feeding-side movable plate 67.

In the feeding-side buffer unit 60, the print medium S is wound around each of the transport rollers 303 to 311. The feeding-side buffer unit 60 applies tension to the print medium S in the direction of gravity due to the weights of the feeding-side movable plate 67 and the transport rollers 308 and 310 attached to the feeding-side movable plate 67.

When slack occurs in the print medium S between the medium supply unit 3 and the platen 54, the feeding-side movable plate 67 is lowered by an amount corresponding to the slack of the print medium S, thereby absorbing the slack of the print medium S. In addition, when strong tension is applied to the print medium S in the transport direction between the medium supply unit 3 and the platen 54, the print medium S is fed from the feeding-side buffer unit 60 by the feeding-side movable plate 67 being raised by the tension. In this way, the feeding-side buffer unit 60 absorbs or alleviates the extra portion of the print medium S and excessive tension attributable to a shortage of the print medium S between the medium supply unit 3 and the platen 54.

The meandering correction unit 70 includes transport rollers 312 and 313, and corrects meandering of the print medium S between the transport rollers 312 and 313. Meandering of the print medium S is a phenomenon in which the transport direction of the print medium S is inclined from the transport path 10 to a direction along the Y axis. An ideal transport state is, for example, a state in which the print medium S is transported from the medium supply unit 3 to the platen 54 without moving in a direction along the Y axis. In this state, the print medium S fed out from the medium supply unit 3 moves along the X axis and reaches the platen 54, without moving in a direction along the Y axis. However, the print medium S may be inclined with respect to the X axis due to the influence of an inclination of the transport rollers 303 to 311, or the like. The state of such an inclination is called meandering. When the movement direction of the print medium S is a direction in which the print medium is inclined with respect to the X axis, the meandering correction unit 70 corrects the movement direction. The print medium S transported from the meandering correction unit 70 toward the platen 54 is in a state in which meandering is substantially eliminated.

A meandering accuracy maintenance region 75 for maintaining the meandering accuracy of the print medium S is provided between the meandering correction unit 70 and the platen 54. The meandering accuracy indicates a degree of meandering of the print medium S, that is, a degree of movement thereof in a direction intersecting the X axis, and may be referred to as transport accuracy. The transport rollers 313, 314, 315, 316, 317, 318, 319, 320, and 321 are disposed in the meandering accuracy maintenance region 75.

The transport rollers 313 and 314 are directly or indirectly attached to the frame of the printing apparatus 1. The transport rollers 313 and 314 are rotatably supported.

A vertical plate 71 fixed directly or indirectly to the frame of the printing apparatus 1 is disposed in the meandering accuracy maintenance region 75. The transport roller 315 is rotatably supported at a lower end part of the vertical plate 71. In addition, the six transport rollers 316, 317, 318, 319, 320, and 321 are disposed at the central and upper parts of the vertical plate 71. Each of the transport rollers 316 to 321 is rotatably supported by the vertical plate 71. In the meandering accuracy maintenance region 75, tension is applied to the print medium S being transported. This tension prevents the print medium S from wrinkling or sagging. The print medium S is transported to the platen 54 through the meandering accuracy maintenance region 75. A configuration including the first transport rollers 313 to 321 and the vertical plate 71 disposed in the meandering accuracy maintenance region 75 is referred to as a first transport roller unit 4. A configuration of the first transport roller unit 4 will be described below.

The transport rollers 313 to 321 disposed in the meandering accuracy maintenance region 75 transport the print medium S while maintaining the meandering accuracy corrected by the meandering correction unit 70.

The drying unit 7 is disposed downstream of the printing unit 5 in the transport path 10. Transport rollers 322, 323, 324, 325, and 326 are disposed in the drying unit 7. The drying unit 7 includes a heater that heats the printing surface and/or the back of the printing surface of the print medium S, and dries the ink ejected by the printing unit 5.

Transport rollers 327, 328, 329, and 330 are disposed downstream of the drying unit 7 in the transport path 10. With these transport rollers 327 to 330, the print medium S is disposed in a winding-side buffer unit 61. The winding-side buffer unit 61 includes transport rollers 331 to 339. The winding-side buffer unit 61 includes a winding-side fixed plate 68 fixed to a fixing unit, and a winding-side movable plate 69 that can move up and down. The six transport rollers 332 to 336 and 338 are rotatably supported on the winding-side fixed plate 68, and one transport roller (dancer roller or winding-side movable roller) 337 is rotatably supported on the winding-side movable plate 69. The transport rollers 339 to 343 are rotatably supported by a fixing unit.

The print medium S is wound around each of the transport rollers 331 to 339 in the winding-side buffer unit 61. The winding-side buffer unit 61 applies tension to the print medium S in the direction of gravity by using the weights of the winding-side movable plate 69 and the winding-side movable roller 337 attached to the winding-side movable plate 69.

When slack occurs in the print medium S between the drying unit 7 and the medium collection unit 8, the winding-side movable plate 69 is lowered by the amount of the slack of the print medium S to absorb the slack of the print medium S. In addition, when strong tension is applied to the print medium S in the transport direction between the drying unit 7 and the medium collection unit 8, the winding-side movable plate 69 is raised due to the tension, and thus the print medium S is fed out from the winding-side buffer unit 61. In this way, the winding-side buffer unit 61 absorbs or alleviates the extra portion of the print medium S and excessive tension attributable to a shortage of the print medium S between the drying unit 7 and the medium collection unit 8.

2. Configuration of First Transport Roller Unit

Figure 2:
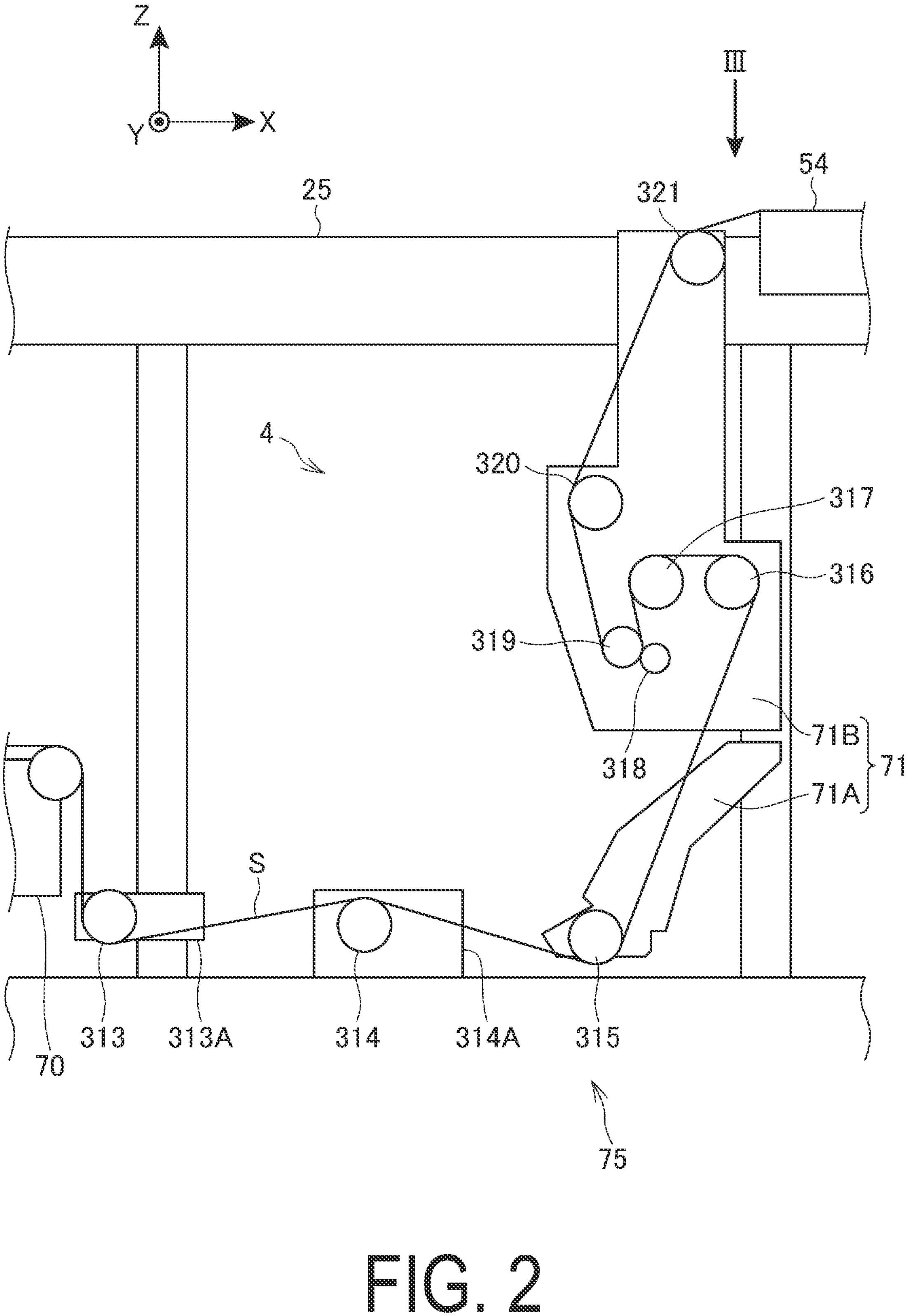
FIG. 2 is a side view illustrating a configuration of a first transport roller unit.

FIG. 2 is a side view illustrating a configuration of the first transport roller unit 4.

Hereinafter, the plurality of transport rollers 313 to 321 that transport the print medium S from the meandering correction unit 70 to the printing unit 5 are referred to as first transport rollers 313 to 321. In addition, the plurality of transport rollers 322 to 332 that transport the print medium S from the printing unit 5 to the winding-side buffer unit 61 are defined as second transport rollers 322 to 332.

A fixing unit 313A that rotatably supports the transport roller 313 and a fixing unit 314A that rotatably supports the transport roller 314 are disposed in the first transport roller unit 4. The fixing units 313A and 314A and the vertical plate 71 are directly or indirectly fixed to the frame of the printing apparatus 1.

The vertical plate 71 includes a lower plate 71A and an upper plate 71B. The lower plate 71A rotatably supports the transport roller 315. The upper plate 71B rotatably supports the first transport rollers 316, 317, 319, 320, and 321. The first transport roller 318 is a driving roller driven by the supply nip motor M3 as described above. The first transport roller 318 is rotatably supported by the upper plate 71B and is coupled to the supply nip motor M3.

The print medium S meanders due to factors such as an inclination of the rollers that transport the print medium S as described above. Specifically, factors that cause a deviation in transport and reduce the meandering accuracy are greatly affected by parallelism or alignment between the rollers, and a distance between the transport rollers. In other words, if the first transport rollers 313 to 321 are attached in parallel at high accuracy and the intervals between the first transport rollers 313 to 321 are short, the meandering accuracy of the print medium in the first transport roller unit 4 does not decrease. That is, the meandering accuracy corrected by the meandering correction unit 70 is maintained even in the first transport roller unit 4.

Figure 3:
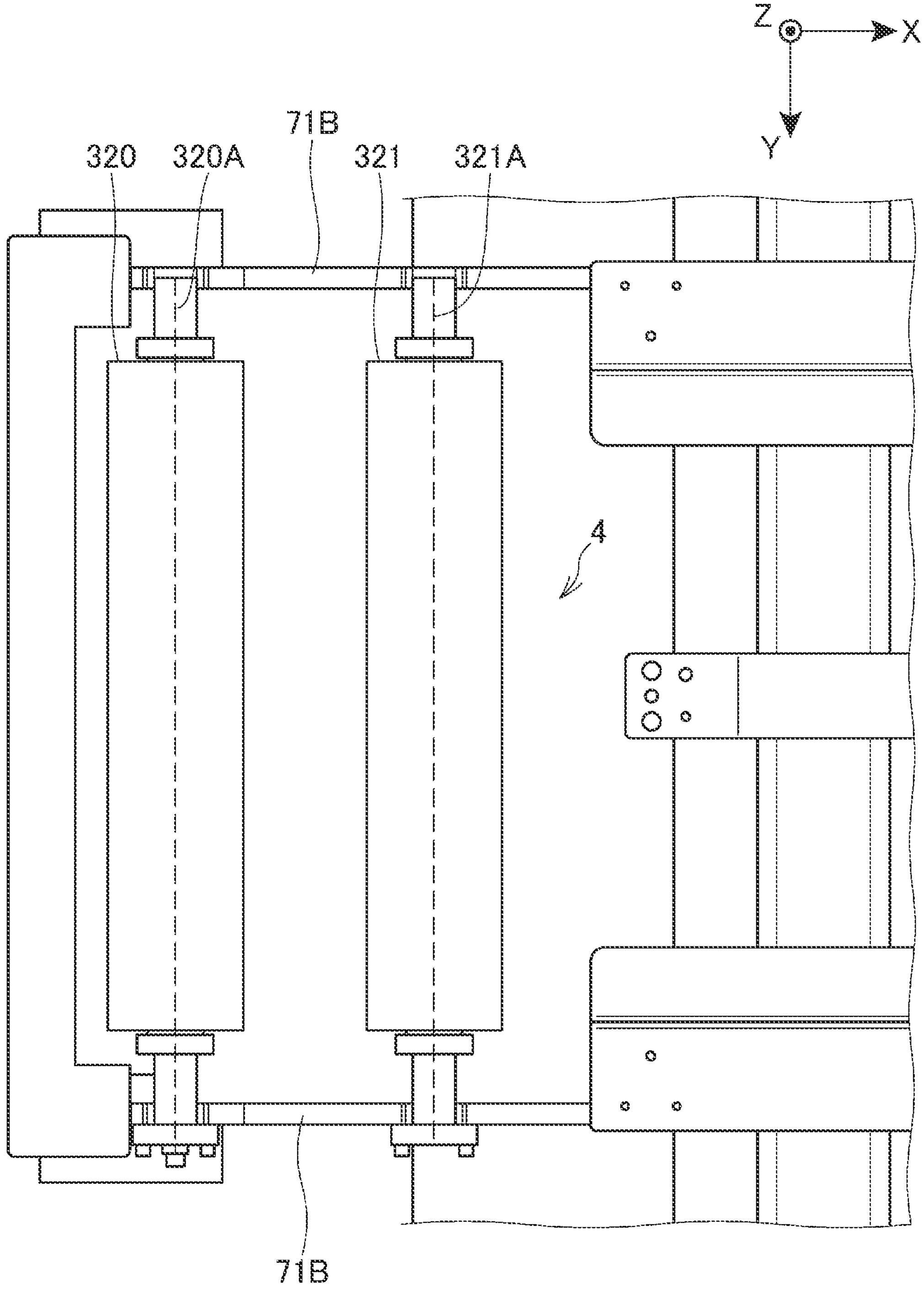
FIG. 3 is a plan view of the main part of the first transport roller unit.

FIG. 3 is a plan view of the main part of the first transport roller unit 4 viewed from the direction III of FIG. 2.

The first transport roller 320 and the first transport roller 321 are disposed parallel to each other at a predetermined interval as illustrated in FIG. 3. That is, the first transport rollers 320 and 321 are installed at the upper plate 71B such that a rotation axis 320A of the first transport roller 320 and a rotation axis 321A of the first transport roller 321 have predetermined parallelism to be described later. In addition, an interval between the rotation axis 320A and the rotation axis 321A is referred to as an inter-axis distance. The inter-axis distance between the rotation axis 320A and the rotation axis 321A is equal to or less than a predetermined interval described later.

Figure 4:
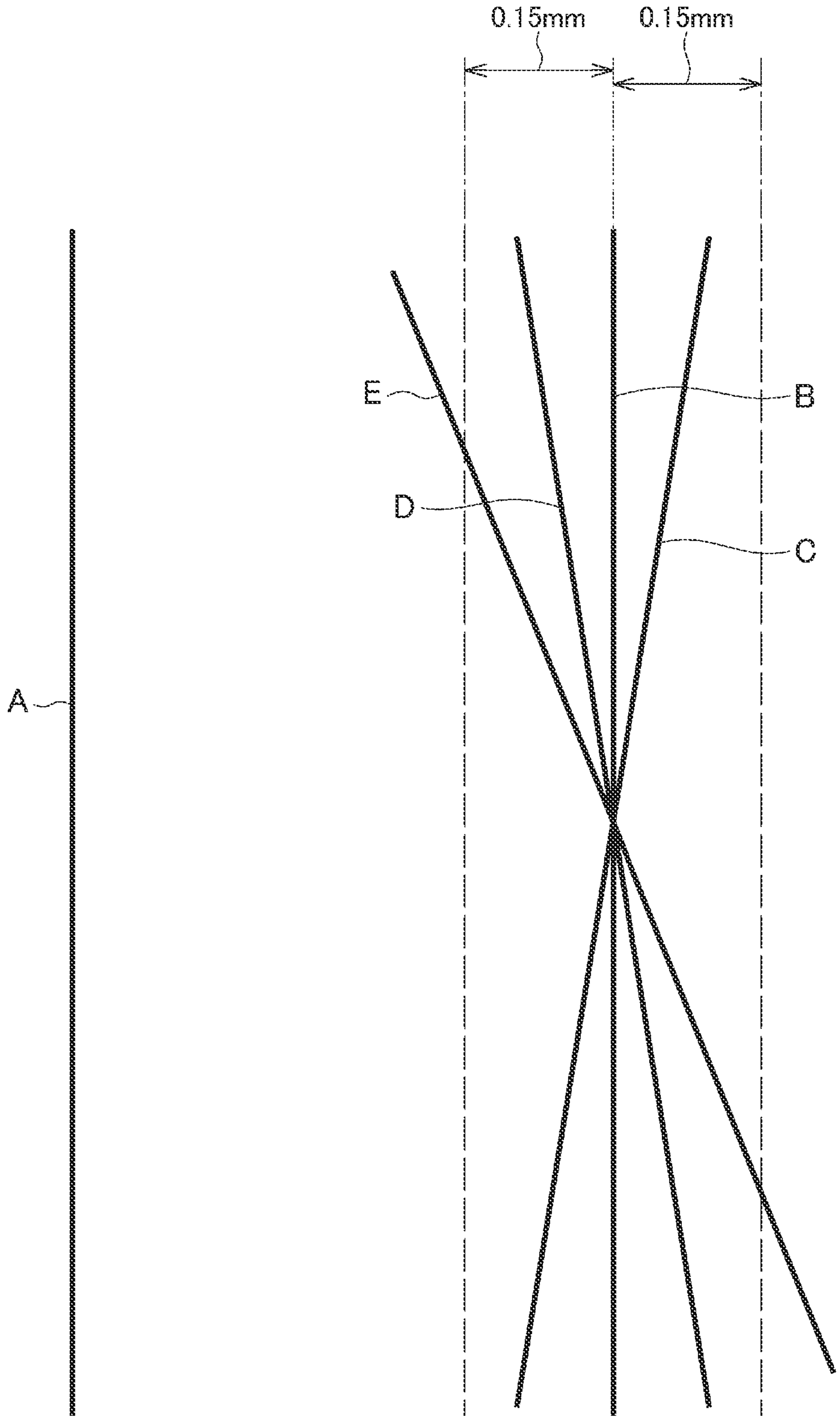
FIG. 4 is an explanatory diagram of parallelism between first transport rollers.

FIG. 4 is an explanatory diagram of parallelism between the first transport rollers.

With respect to the rotation axes of transport rollers, reference sign A indicates the rotation axis of any one of the first transport rollers 313, 314, 315, 316, 317, 318, 319, 320, and 321. Reference sign B, C, D, and E are rotation axes of the first transport rollers adjacent to the first transport roller indicated by reference sign A. For example, reference sign A indicates the rotation axis 320A, and reference signs B to E each indicate the rotation axis 321A.

Reference sign B indicates a state in which the parallelism between two first transport rollers is 0 mm. Reference sign C indicates a state in which the parallelism between two first transport rollers is within 0.15 mm. Reference sign D indicates a state in which the parallelism between two first transport rollers is within 0.15 mm. Reference sign E indicates an example in which the parallelism between two first transport rollers exceeds 0.15 mm in an inclined manner.

Through a demonstration experiment, the present inventors have found that meandering of the print medium S can be alleviated to a preferable range by keeping the parallelism between adjacent first transport rollers of the first transport rollers 313 to 321 of the first transport roller unit 4 within 0.15 mm.

In addition, the present inventors have found that, for the first transport rollers 313 to 321 of the first transport roller unit 4, meandering of the print medium S can be alleviated to a preferable range when the inter-axis distance between adjacent first transport rollers is equal to or less than 400 mm.

In these cases, the first transport rollers 313 to 321 have a diameter of 80 mm, and desirably a diameter of 10 mm to 100 mm. Note that the present disclosure is not applied to thin transport rollers such as those having a diameter less than 10 mm.

Therefore, the present inventors have found the following about at least one first transport roller and a first transport roller adjacent thereto of the first transport rollers 313 to 321 of the first transport roller unit 4. That is, at least one of the following two conditions that the parallelism between these two first transport rollers is within 0.15 mm or that the inter-axis distance between these two first transport rollers is equal to or less than 400 mm may be satisfied. In addition, both of these two conditions may be satisfied.

Furthermore, for all of the first transport rollers 313 to 321, at least one of the conditions that the parallelism with respect to any adjacent first transport rollers satisfies the above condition or that the inter-axis distance with respect to any adjacent first transport rollers satisfies the above condition may be satisfied. In addition, for all of the first transport rollers 313 to 321, the parallelism and the inter-axis distance with respect to any adjacent first transport rollers may satisfy the above-described conditions.

Note that the parallelism may not be parallelism between adjacent first transport rollers, but may be parallelism with respect to a reference transport roller with any of the first transport rollers 313 to 321 serving as the reference transport roller. In this case, deviation in parallelism gradually increases as the number of transport rollers increases. For this reason, it is desirable that the parallelism between adjacent transport rollers be set to be in a range narrower than 0.15 mm.

For example, with one first transport roller serving as a reference, if the rotation axis B of another transport roller is parallel to the reference rotation axis A, the parallelism is 0 mm. The parallelism of the rotation axes C and D of other transport rollers is within $\alpha$ mm. The parallelism of the rotation axis E is outside the range of $\alpha$ mm. In this embodiment, with the rotation axis of the first transport roller 321 positioned immediately before the platen 54 serving as a reference rotation axis A, the parallelism of the first transport rollers 313 to 321 is set to be within $\alpha$ mm ($\alpha$=0.15). It has been verified that if the parallelism of the first transport rollers 313 to 321 is set to be within 0.15 mm, the meandering accuracy of the print media S from the meandering correction unit 70 to the printing unit 5 is favorably maintained.

For example, it is assumed that with the rotation axis 321A of the first transport roller 321 serving as a reference indicated by reference sign A, the parallelism of the first transport rollers 313 to 321 is set to be within 0.15 mm. In this case, for example, a state may occur in which, of two adjacent first transport rollers, the parallelism of one first transport roller with respect to the reference is 0.15 mm, the parallelism of the other first transport roller with respect to the reference is −0.15 mm, and thus the one first transport roller and the other first transport roller are inclined in opposite directions. In this state, the parallelism between the adjacent first transport rollers is not within 0.15 mm.

In another embodiment, with the rotation axis of the first transport roller 321 serving as a reference rotation axis A, the parallelism of the first transport rollers 313 to 321 with respect to the reference is set to be within 0.15 mm, and furthermore the parallelism between the adjacent first transport rollers is set to be within 0.15 mm. According to this configuration, the parallelism of the first transport rollers 313 to 321 can be maintained at good accuracy, and the meandering accuracy of the print medium S from the meandering correction unit 70 to the printing unit 5 is more favorably maintained.

In addition, for example, of the first transport rollers 313 to 321, the first transport roller 321 positioned immediately before the platen 54 is set as the reference rotation axis A. In this case, the parallelism of the rotation axis of each of the first transport rollers 313 to 321 is set to be within 0.15 mm, and the inter-axis distance between the first transport rollers 313 to 321 is set to be equal to or less than 400 mm. In this example, even if the inter-axis distance between the first transport rollers 313 to 321 is set to be relatively long in a range equal to or less than 400 mm, the amount of change in deviation of the print media S in the transport direction is small, meandering is alleviated due to the influence of the parallelism of the next transport roller, and thus the meandering accuracy can be improved.

Although the printing apparatus 1 includes the meandering correction unit 70 in the embodiment described above, the configuration described above can also be applied to a printing apparatus 1 not including the meandering correction unit 70. In this case, a plurality of transport rollers that transport the print media S from the medium supply unit 3 to the printing unit 5 may be set as the first transport rollers, and the parallelism of the rotation axis of each of the first transport rollers may be set to be within 0.15 mm. In addition, the inter-axis distance between the plurality of first transport rollers may be set to be equal to or less than 400 mm.

In addition, in this embodiment, the interval between two adjacent first transport rollers of the first transport rollers 313 to 321 is set to be narrower than the intervals between the second transport rollers 322 to 332. The average value of the intervals between the first transport rollers 313 to 321 may be set to be narrower than the average value of the intervals between the second transport rollers 322 to 332.

Since the second transport rollers 322 to 332 transport the print medium S on which printing was performed by the printing unit 5, the print quality is little affected by a decrease in the meandering accuracy in the second transport rollers 322 to 332. In addition, by increasing the inter-axis distance between the second transport rollers 322 to 332, the number of rollers downstream of the printing unit 5 can be reduced, as well as reduction in size and weight of the printing apparatus 1, reduction in manufacturing costs of the printing apparatus 1, and reduction in the number of manufacturing steps of the printing apparatus 1 can be achieved.

In addition, when the platen 54 of the printing apparatus 1 is increased in size in order to improve the printing speed, an increase in the number of transport rollers in the entire printing apparatus 1 can be avoided even if the transport path 10 of the print medium S from the medium supply unit 3 to the printing unit 5 is lengthened.

3. Other Embodiments

The above embodiment is merely a specific example to which the present disclosure is applied. The present disclosure is not limited to the configuration of the above embodiment, and can be implemented in various aspects without departing from the gist of the disclosure.

For example, although the printing apparatus 1 has been described in the above-described embodiment as having a configuration in which the feeding-side buffer unit 60, the winding-side buffer unit 61, and the drying unit 7 are included, the disclosure is also applicable to a printing apparatus 1 having no such configuration. In addition, the printing apparatus 1 is not limited to an apparatus in which a continuous sheet wound around the roll body 32 is used as the print medium S, and an aspect of the continuous sheet can be changed as desired.

In addition, although the ejection head 51 in the above embodiment is configured to move in the X-axis direction and the Y-axis direction on the print medium S supported by the platen 54 and eject ink to the entire print medium S, a so-called single-pass printing method may be adopted in which the ejection head 51 is longer than the print medium S in the width direction, i.e., in the Y-axis direction, and in which an image is formed by moving the ejection head 51 only once in the X-axis direction.

In addition, although the inkjet printing apparatus 1 has been described in the above-described embodiment, this is an example, and the disclosure can be applied to printing apparatuses adopting other printing methods.

In addition, the numbers of transport rollers, first transport rollers, and second transport rollers, and the number of motors that drive the transport rollers described in the above embodiment are merely examples, and can be arbitrarily changed.

4. Configurations Described Based on Embodiments

The following configurations are described based on the above embodiment.

Configuration 1

A printing apparatus including: a printing unit that performs printing on a print medium; a support unit disposed facing the printing unit, the support unit supporting the print medium; a plurality of first transport rollers that transport the print medium to the support unit; a medium collection unit that winds in a roll shape the print medium on which printing was performed by the printing unit; and a plurality of second transport rollers that transport the print medium from the support unit to the medium collection unit, in which each interval between the plurality of first transport rollers is narrower than an average value of each interval between the plurality of second transport rollers.

According to the printing apparatus described in Configuration 1, meandering accuracy of the print medium in the first transport rollers that transport the print medium to the printing unit can be made favorable. In addition, since each interval between the second transport rollers can be made larger than each interval between the first transport rollers, increase in the number of transport rollers can be curbed. With this configuration, reduction in size and weight of the printing apparatus, reduction in manufacturing costs of the printing apparatus, and reduction in the number of manufacturing steps of the printing apparatus can be achieved.

Configuration 2

The printing apparatus according to Configuration 1, in which an interval between adjacent first transport rollers of the plurality of first transport rollers is equal to or less than 400 mm.

According to the printing apparatus of Configuration 2, by setting the interval between the first transport rollers to be equal to or less than 400 mm, the meandering accuracy of the print medium upstream of the printing unit can be made favorable and the print quality can be improved.

Configuration 3

The printing apparatus according to Configuration 1 or 2, in which parallelism of the first transport rollers included in the plurality of first transport rollers with respect to a reference transport roller is equal to or less than 0.15 mm.

According to the printing apparatus of Configuration 3, by setting the parallelism of the first transport rollers with respect to a reference transport roller to be equal to or less than 0.15 mm, the meandering accuracy of the print medium upstream of the printing unit can be made favorable and the print quality can be improved.

Configuration 4

The printing apparatus according to Configuration 3, in which the reference transport roller is the first transport roller closest to the support unit of the plurality of first transport rollers.

According to the printing apparatus described in Configuration 4, with the first transport roller positioned closest to the printing unit serving as a reference, the parallelism of the first transport rollers is set to be equal to or less than 0.15 mm, and thus the meandering accuracy of the print medium at a position at which the print quality is greatly affected can be made favorable.

Configuration 5

The printing apparatus according to any one of Configurations 1 to 4, in which the parallelism between adjacent first transport rollers of the plurality of first transport rollers is equal to or less than 0.15 mm.

According to the printing apparatus of Configuration 5, by setting the parallelism between adjacent first transport rollers to be equal to or less than 0.15 mm, the meandering accuracy of the print medium upstream of the printing unit can be made favorable and the print quality can be improved.

Configuration 6

The printing apparatus according to any one of Configurations 1 to 5, further including a meandering correction unit upstream of the support unit, in which the plurality of first transport rollers are disposed between the meandering correction unit and the support unit in a transport path of the print medium.

According to the printing apparatus described in Configuration 6, when the print medium whose meandering accuracy has been corrected by the meandering correction unit is transported, the meandering accuracy can be made favorable.

What is claimed is:

1. A printing apparatus comprising:

a printing unit configured to perform printing on a print medium;

a support unit disposed facing the printing unit, the support unit supporting the print medium;

a plurality of first transport rollers configured to transport the print medium to the support unit;

a medium collection unit configured to wind in a roll shape the print medium on which printing was performed by the printing unit; and a plurality of second transport rollers configured to transport the print medium from the support unit to the medium collection unit, wherein each interval between adjacent rollers of the plurality of first transport rollers is narrower than an average value of each interval between adjacent rollers of the plurality of second transport rollers.

2. The printing apparatus according to claim 1, wherein all of an interval between adjacent first transport rollers of the plurality of first transport rollers is equal to or less than 400 mm.

3. The printing apparatus according to claim 1, wherein parallelism of the first transport rollers included in the plurality of first transport rollers with respect to a reference transport roller is equal to or less than 0.15 mm.

4. The printing apparatus according to claim 3, wherein the reference transport roller is the first transport roller closest to the support unit of the plurality of first transport rollers.

5. The printing apparatus according to claim 3, wherein all of a parallelism between adjacent first transport rollers of the plurality of first transport rollers is equal to or less than 0.15 mm.

6. The printing apparatus according to claim 1, further comprising a meandering correction unit upstream of the support unit, wherein the plurality of first transport rollers are disposed between the meandering correction unit and the support unit in a transport path of the print medium.

* * * * *